United States Patent
Tseng et al.

(10) Patent No.: US 10,117,229 B2
(45) Date of Patent: Oct. 30, 2018

(54) METHOD AND APPARATUS FOR USING A CONFIGURED RESOURCE IN A WIRELESS COMMUNICATION SYSTEM

(71) Applicant: ASUSTeK Computer Inc., Taipei (TW)

(72) Inventors: Li-Chih Tseng, Taipei (TW); Meng-Hui Ou, Taipei (TW); Yu-Hsuan Guo, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 209 days.

(21) Appl. No.: 15/176,805

(22) Filed: Jun. 8, 2016

(65) Prior Publication Data

US 2016/0366682 A1 Dec. 15, 2016

Related U.S. Application Data

(60) Provisional application No. 62/174,909, filed on Jun. 12, 2015, provisional application No. 62/174,952, filed on Jun. 12, 2015.

(51) Int. Cl.
*H04W 72/04* (2009.01)
*H04L 29/12* (2006.01)

(52) U.S. Cl.
CPC ..... *H04W 72/0413* (2013.01); *H04L 61/6022* (2013.01); *H04W 72/04* (2013.01); *H04W 72/0446* (2013.01)

(58) Field of Classification Search
CPC ....... H04W 80/04; H04W 8/26; H04W 72/04; H04W 88/08; H04W 76/00; H04W 84/08;

(Continued)

(56) References Cited

U.S. PATENT DOCUMENTS 8,942,124 B2 * 1/2015 Marchand ......... H04W 28/0278
370/252
2009/0113086 A1 * 4/2009 Wu .................... H04W 72/1284
710/56

(Continued)

FOREIGN PATENT DOCUMENTS

KR 10-2011-0138687 12/2011
WO WO2014/097357 1/2017

OTHER PUBLICATIONS

Nokia Siemens Networks, "Padding BSR and Empty Transmission Buffers", 3GPP TSG-RAN WG2 #71bis, R2-105318, URL: http://ftp.3gpp.org/TSG_RAN/WG2_L2/TS GR 2_71 bis/Docs/R2 - 105318.zip (Oct. 15, 2010).

(Continued)

*Primary Examiner* — Brenda H Pham
(74) *Attorney, Agent, or Firm* — Blue Capital Law Firm, P.C.

(57) ABSTRACT

A method and apparatus for using a configured resource by a user equipment in a wireless communication system. In one embodiment, the method includes receiving a signaling to configure an uplink resource which is available in multiple transmission time intervals (TTIs), including a first TTI and a second TTI. The method includes performing a transmission using the uplink resource in the first TTI in response to reception of the signaling and not in the second TTI which is not corresponding to reception of the signaling, wherein the UE has no data available for transmission.

20 Claims, 15 Drawing Sheets

(58) Field of Classification Search
CPC .... H04W 76/02; H04W 84/12; H04B 7/2123; H04B 7/212
USPC .......................... 370/349, 322, 329, 341, 348
See application file for complete search history.

(56) References Cited

U.S. PATENT DOCUMENTS

| | | | | |
|---|---|---|---|---|
| 2009/0197610 A1* | 8/2009 | Chun | ................ | H04W 72/1284 455/450 |
| 2010/0080185 A1* | 4/2010 | Guo | ..................... | H04L 1/1848 370/329 |
| 2011/0141983 A1* | 6/2011 | Hong | ................ | H04W 28/0278 370/329 |
| 2011/0171967 A1* | 7/2011 | Lee | ................... | H04W 72/0486 455/452.1 |
| 2011/0310833 A1 | 12/2011 | Lee | | |
| 2012/0188956 A1* | 7/2012 | Dong | ................ | H04W 72/1284 370/329 |
| 2014/0177560 A1* | 6/2014 | Guo | ................. | H04W 72/1268 370/329 |
| 2014/0293896 A1* | 10/2014 | Kuo | ................. | H04W 72/0413 370/329 |

OTHER PUBLICATIONS

ETSI TS 136 523-1 V8.0.1, 3GPP TS 36.523-1 version 8.0.1 Release 8,URL, http://www.3gpp.org/ftp/Specs/archive/36_series/36.523-1/36523-1-801.zip (Jan. 31, 2009).

Samsung, "UE battery drain due to blind scheduling", 3GPP TSG-RAN2#70, R2-103554, URL, http://ftp.3gpp.org/TSG_RAN/WG2_RL2/TS GR2_70 bis/Docs/R2-103554.zip (Jul. 2, 2010).

Office Action from the Korean Intellectual Property Office in the corresponding KR application No. 10-2016-0071327, dated Mar. 20, 2017.

Nokia Siemens Networks, "Padding BSR and Empty Transmission Buffer", 3Gpp TSG-RAN WG2 Meeting #71bis R2-105318, Oct. 11-15, 2010, Chapter 2,3,5.4.2.1.

3GPP Technical Specification, "3rd Generation Partnership Project; Technical Specification Group Radio Access Network; Evolved Universal Terrestrial Radio Access (E-UTRA) Medium Access Control (MAC) protocol specification (Release 12)", 3GPP TS 36.321 V12.5.0; Mar. 2015, Chapter 5.4.1,5.4.2.2,5.4.5,5.14.1.4.

TW Office Action from corresponding TW Application No. 105118273, dated Sep. 28, 2016.

3GPP TSG-Ran2#70 meeting, Stockholm, Sweden, Jun. 28-Jul. 2, 2010, Tdoc R-103554.

3GPP TSG-Ran WG2 Meeting #89, Athens Greece, Feb. 10-14, 2015, R2-150717.

Office Action from corresponding JP Patent Application No. 2016-114743, dated Sep. 21, 2017.

Nokia Siemens Networks: "Padding BSR and Empty Transmission Buffers", 3GPP Draft; R2-105318 Padding BSR and Empty Buffers, 3rd Generation Partnership Project (3GPP), Mobile D1 Competence Centre ; 650, Route Des Lucioles ; F-06921 Sophia-Antipolis Cedex ; France, vol. RAN WG2, No. Xi'an; 20101011, Oct. 5, 2010 (Oct. 5, 2010), XP050452576.

European Search Report from corresponding EP Application No. 16173602.0, dated Oct. 17, 2016.

* cited by examiner

METHOD AND APPARATUS FOR USING A CONFIGURED RESOURCE IN A WIRELESS COMMUNICATION SYSTEM

CROSS-REFERENCE TO RELATED APPLICATIONS

The present application claims the benefit of U.S. Provisional Patent Application Ser. No. 62/174,909 filed on Jun. 12, 2015 and U.S. Provisional Patent Application Ser. No. 62/174,952 filed on Jun. 12, 2015, the entire disclosures of which are incorporated herein in their entirety by reference.

FIELD

This disclosure generally relates to wireless communication networks, and more particularly, to a method and apparatus for using a configured resource in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure for which standardization is currently taking place is an Evolved Universal Terrestrial Radio Access Network (E-UTRAN). The E-UTRAN system can provide high data throughput in order to realize the above-noted voice over IP and multimedia services. The E-UTRAN system's standardization work is currently being performed by the 3GPP standards organization. Accordingly, changes to the current body of 3GPP standard are currently being submitted and considered to evolve and finalize the 3GPP standard.

SUMMARY

Methods and apparatuses for using a configured resource by a user equipment in order to utilize configured uplink resources more efficiently are disclosed herein. In one embodiment, the method includes receiving a signaling to configure an uplink resource which is available in multiple transmission time intervals (TTIs), including a first TTI and a second TTI. The method includes performing a transmission using the configured uplink resource in the first TTI in response to reception of the signaling and not in the second TTI that is not corresponding to reception of the signaling, wherein the UE has no data available for transmission.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including: RP-150465, "New SI proposal: Study on Latency reduction techniques for LTE"; RP-150310, "Study on Latency reduction techniques For LTE"; TS 36.321 v12.5.0, "E-UTRA MAC protocol specification (Release 12)"; TS 36.331 v12.5.0, "E-UTRA RRC protocol specification (Release 12)"; and TS 36.213 v12.5.0, "E-UTRA Physical layer procedures (Release 12)". The standards and documents listed above are hereby expressly incorporated by reference in their entirety.

Figure 1:
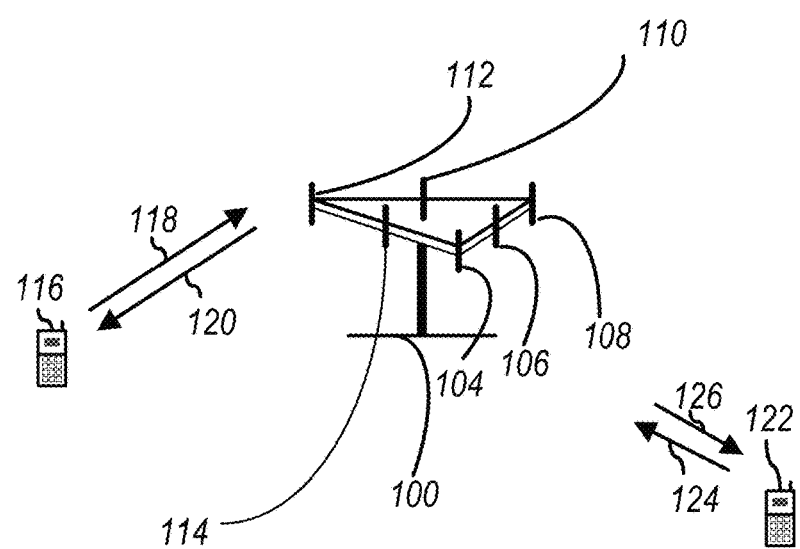
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
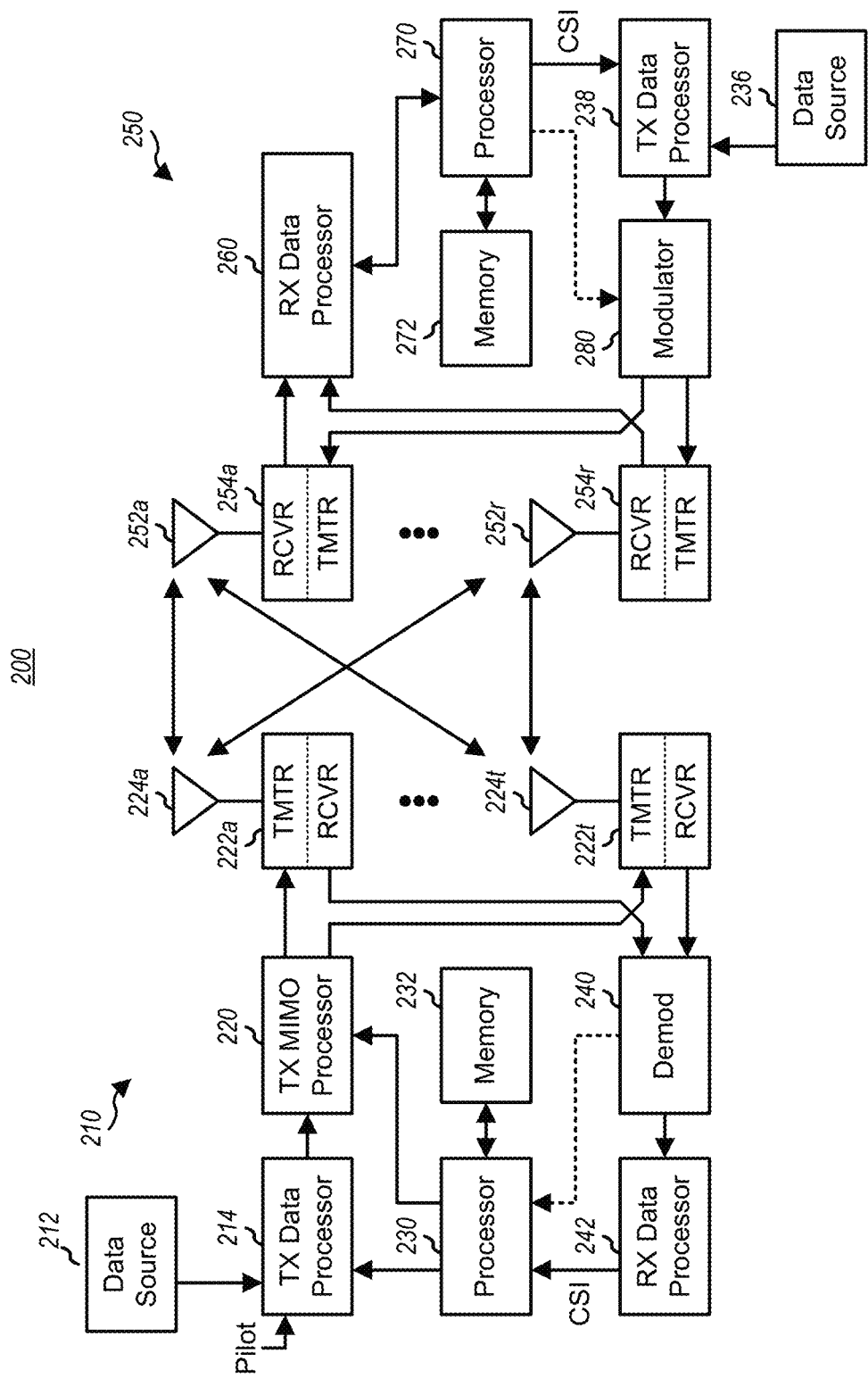
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
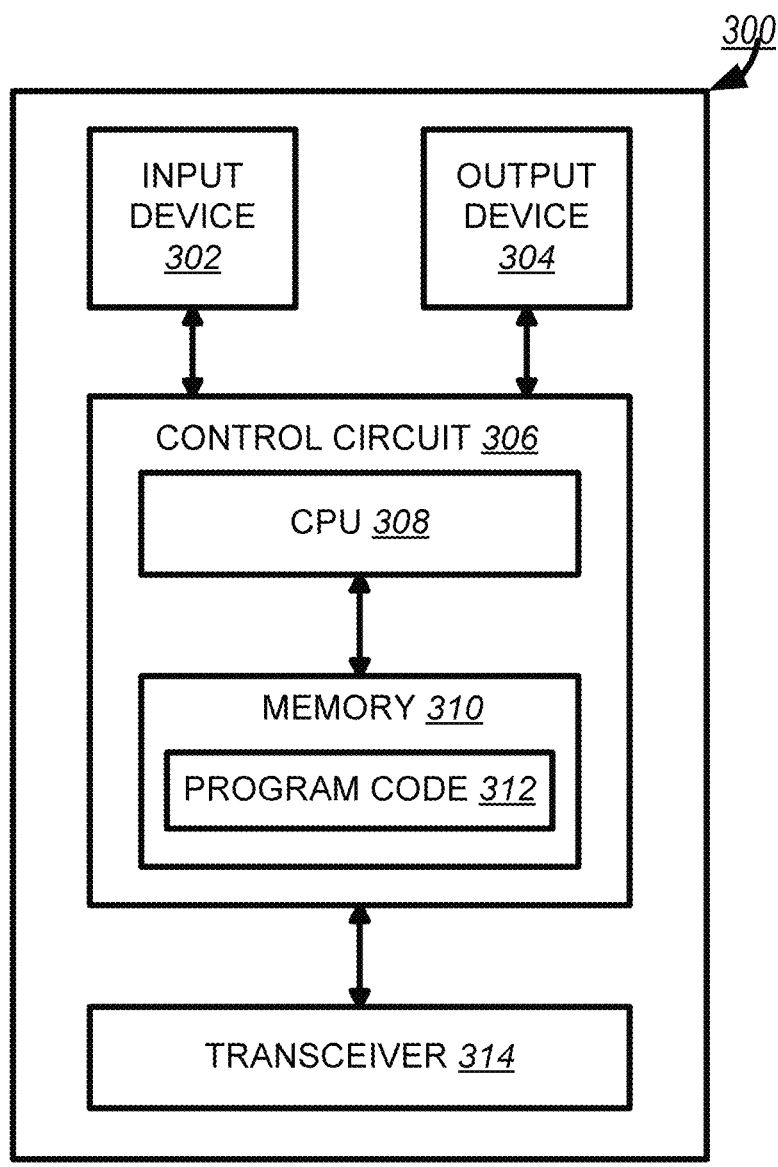
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
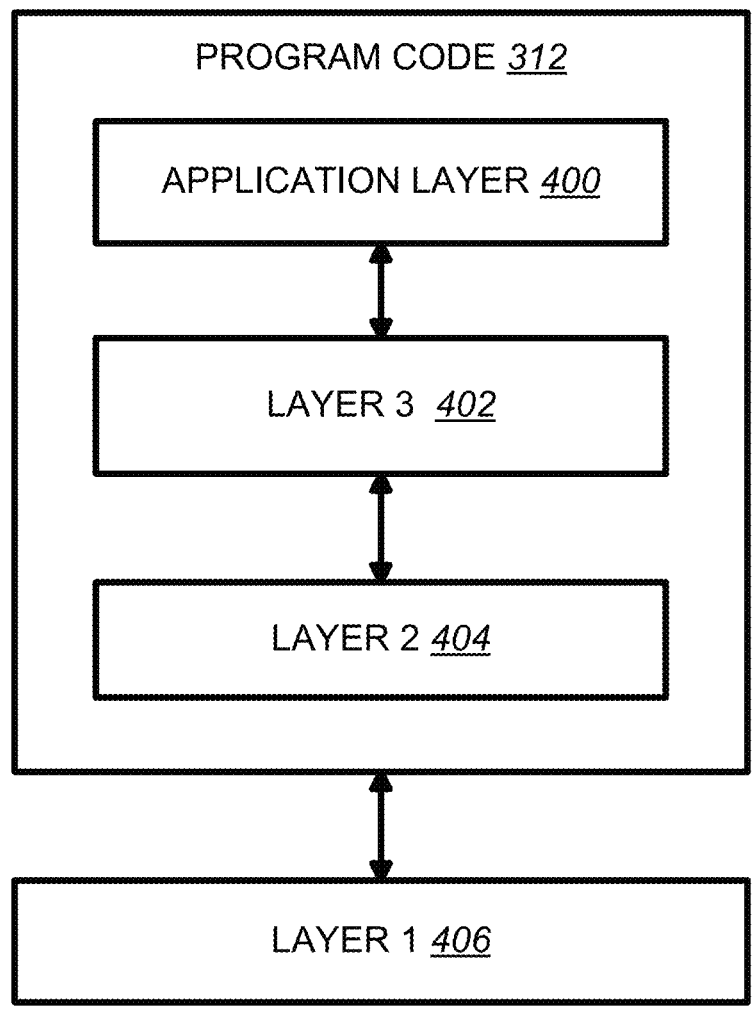
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

Packet data latency is one of the important metrics for performance evaluation. Reducing packet data latency improves the system performance. In 3GPP RP-150465, the study item "study on latency reduction techniques for LTE" aims to investigate and standardize some techniques of latency reduction.

According to 3GPP RP-150465, the objective of the study item is to study enhancements to the E-UTRAN radio system in order to significantly reduce the packet data latency over the LTE Uu air interface for an active UE and significantly reduce the packet data transport round trip latency for UEs that have been inactive for a longer period (in connected state). The study area includes resource efficiency, including air interface capacity, battery lifetime, control channel resources, specification impact and technical feasibility. Both Frequency Division Duplex (FDD) and Time Division Duplex (TDD) modes are considered.

Figure 5:
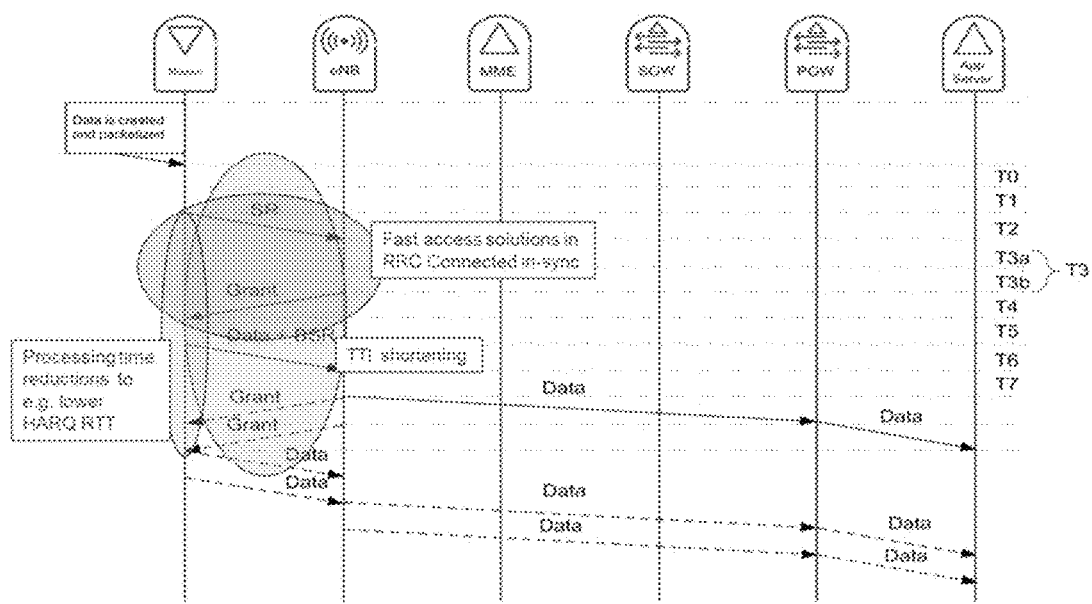
FIG. 5 is a reproduction of a figure from 3GPP RP-150310.

According to 3GPP RP-150465, two areas should be studies and documented:
  Fast uplink access solutions
    for active UEs and UEs that have been inactive a longer time, but are kept in RRC Connected, focus should be on reducing user plane latency for the scheduled UL transmission and getting a more resource efficient solution with protocol and signaling enhancements, compared to the pre-scheduling solutions allowed by the standard today, both with and without preserving the current TTI length and processing times
  TTI shortening and reduced processing times
  Assess specification impact and study feasibility and performance of TTI lengths between 0.5 ms and one OFDM symbol, taking into account impact on reference signals and physical layer control signaling FIG. 5 is reproduced from 3GPP RP-150310 and it illustrates the improvement corresponding to the areas. In 3GPP RP-150310, a candidate of fast uplink access solutions was raised:
  Pre-grant→fast uplink access but with limited throughput
  Resources can be allocated with (modified) SPS
  Remove the requirement to send padding when no data is in buffer saves→battery resources when inactive
  Good throughput per watt statistics
  Switch to dynamic scheduling when entering active phase→optimizing throughput when having lot of data in send buffer In the current 3GPP E-UTRA MAC specification as disclosed in 3GPP TS 36.321 v12.5.0, semi-persistent scheduling (SPS) operates as below:

5.10 Semi-Persistent Scheduling

When Semi-Persistent Scheduling is enabled by RRC, the following information is provided [8]:
  Semi-Persistent Scheduling C-RNTI;
  Uplink Semi-Persistent Scheduling interval semiPersistSchedIntervalUL and number of empty transmissions before implicit release implicitReleaseAfter, if Semi-Persistent Scheduling is enabled for the uplink;
  Whether twoIntervalsConfig is enabled or disabled for uplink, only for TDD;
  Downlink Semi-Persistent Scheduling interval semiPersistSchedIntervalDL and number of configured HARQ processes for Semi-Persistent Scheduling numberOfConfSPS-Processes, if Semi-Persistent Scheduling is enabled for the downlink;

When Semi-Persistent Scheduling for uplink or downlink is disabled by RRC, the corresponding configured grant or configured assignment shall be discarded.

Semi-Persistent Scheduling is supported on the SpCell only.

Semi-Persistent Scheduling is not supported for RN communication with the E-UTRAN in combination with an RN subframe configuration.

NOTE: When eIMTA is configured for the SpCell, if a configured uplink grant or a configured downlink assignment occurs on a subframe that can be reconfigured through eIMTA L1 signalling, then the UE behaviour is left unspecified.

5.10.1 Downlink

After a Semi-Persistent downlink assignment is configured, the MAC entity shall consider sequentially that the $N^{th}$ assignment occurs in the subframe for which:

$$(10*SFN+\text{subframe}) = [(10*SFN_{start\ time} + \text{subframe}_{start\ time}) + N*\text{semiPersistSchedIntervalDL}] \text{modulo } 10240.$$

Where $SFN_{start\ time}$ and $\text{subframe}_{start\ time}$ are the SFN and subframe, respectively, at the time the configured downlink assignment were (re-)initialised.

5.10.2 Uplink

After a Semi-Persistent Scheduling uplink grant is configured, the MAC entity shall:
  if twoIntervalsConfig is enabled by upper layer:
    set the Subframe_Offset according to Table 7.4-1.
  else:
    set Subframe_Offset to 0.
  consider sequentially that the $N^{th}$ grant occurs in the subframe for which:

$$(10*SFN+\text{subframe}) = [(10*SFN_{start\ time} + \text{subframe}_{start\ time}) + N*\text{semiPersistSchedIntervalUL} + \text{Subframe\_Offset}*(N \text{modulo } 2)] \text{modulo } 10240.$$

Where $SFN_{start\ time}$ and $\text{subframe}_{start\ time}$ are the SFN and subframe, respectively, at the time the configured uplink grant were (re-)initialised.

The MAC entity shall clear the configured uplink grant immediately after implicitReleaseAfter [8] number of consecutive new MAC PDUs each containing zero MAC SDUs have been provided by the Multiplexing and Assembly entity, on the Semi-Persistent Scheduling resource.

NOTE: Retransmissions for Semi-Persistent Scheduling can continue after clearing the configured uplink grant.

5.4.1 UL Grant Reception

In order to transmit on the UL-SCH the MAC entity must have a valid uplink grant (except for non-adaptive HARQ retransmissions) which it may receive dynamically on the PDCCH or in a Random Access Response or which may be configured semi-persistently. To perform requested transmissions, the MAC layer receives HARQ information from lower layers. When the physical layer is configured for uplink spatial multiplexing, the MAC layer can receive up to two grants (one per HARQ process) for the same TTI from lower layers.

If the MAC entity has a C-RNTI, a Semi-Persistent Scheduling C-RNTI, or a Temporary C-RNTI, the MAC entity shall for each TTI and for each Serving Cell belonging to a TAG that has a running timeAlignmentTimer and for each grant received for this TTI:
  if an uplink grant for this TTI and this Serving Cell has been received on the PDCCH for the MAC entity's C-RNTI or Temporary C-RNTI; or if an uplink grant for this TTI has been received in a Random Access Response:
  if the uplink grant is for MAC entity's C-RNTI and if the previous uplink grant delivered to the HARQ entity for the same HARQ process was either an uplink grant received for the MAC entity's Semi-Persistent Scheduling C-RNTI or a configured uplink grant:
    consider the NDI to have been toggled for the corresponding HARQ process regardless of the value of the NDI.
  deliver the uplink grant and the associated HARQ information to the HARQ entity for this TTI.
else, if this Serving Cell is the SpCell and if an uplink grant for this TTI has been received for the SpCell on the PDCCH of the SpCell for the MAC entity's Semi-Persistent Scheduling C-RNTI:
  if the NDI in the received HARQ information is 1:
    consider the NDI for the corresponding HARQ process not to have been toggled;
    deliver the uplink grant and the associated HARQ information to the HARQ entity for this TTI.
  else if the NDI in the received HARQ information is 0:
    if PDCCH contents indicate SPS release:
      clear the configured uplink grant (if any).
    else:
      store the uplink grant and the associated HARQ information as configured uplink grant;
      initialise (if not active) or re-initialise (if already active) the configured uplink grant to start in this TTI and to recur according to rules in subclause 5.10.2;
      consider the NDI bit for the corresponding HARQ process to have been toggled;
      deliver the configured uplink grant and the associated HARQ information to the HARQ entity for this TTI.
else, if this Serving Cell is the SpCell and an uplink grant for this TTI has been configured for the SpCell:
  consider the NDI bit for the corresponding HARQ process to have been toggled;
  deliver the configured uplink grant, and the associated HARQ information to the HARQ entity for this TTI.
NOTE: The period of configured uplink grants is expressed in TTIs.
NOTE: If the MAC entity receives both a grant in a Random Access Response and a grant for its C-RNTI or Semi persistent scheduling C-RNTI requiring transmissions on the SpCell in the same UL subframe, the MAC entity may choose to continue with either the grant for its RA-RNTI or the grant for its C-RNTI or Semi persistent scheduling C-RNTI.
NOTE: When a configured uplink grant is indicated during a measurement gap and indicates an UL-SCH transmission during a measurement gap, the MAC entity processes the grant but does not transmit on UL-SCH.

In the current 3GPP E-UTRA RRC specification as disclosed in 3GPP TS 36.331 v12.5.0, semi-persistent scheduling is configured as below:
  SPS-Config
The IE SPS-Config is used to specify the semi-persistent scheduling configuration.

| SPS-Config information element |
| --- |

```
-- ASN1START
SPS-Config ::= SEQUENCE {
    semiPersistSchedC-RNTI          C-RNTI                      OPTIONAL,     -- Need OR
    sps-ConfigDL                    SPS-ConfigDL                OPTIONAL,     -- Need ON
    sps-ConfigUL                    SPS-ConfigUL                OPTIONAL      -- Need ON
}
SPS-ConfigDL ::=    CHOICE{
    release                         NULL,
    setup                           SEQUENCE {
        semiPersistSchedIntervalDL          ENUMERATED {
                                                sf10, sf20, sf32, sf40, sf64, sf80,
                                                sf128, sf160, sf320, sf640, spare6,
                                                spare5, spare4, spare3, spare2,
                                                spare1},
        numberOfConfSPS-Processes           INTEGER (1..8),
        n1PUCCH-AN-PersistentList           N1PUCCH-AN-PersistentList,
        ...,
        [[  twoAntennaPortActivated-r10     CHOICE {
                release                         NULL,
                setup                           SEQUENCE {
                    n1PUCCH-AN-PersistentListP1-r10 N1PUCCH-AN-PersistentList
                }
            }                                                               OPTIONAL    -- Need
ON
        ]]
    }
}
SPS-ConfigUL ::=    CHOICE {
    release                         NULL,
    setup                           SEQUENCE {
        semiPersistSchedIntervalUL          ENUMERATED {
                                                sf10, sf20, sf32, sf40, sf64, sf80,
                                                sf128, sf160, sf320, sf640, spare6,
                                                spare5, spare4, spare3, spare2,
                                                spare1},
        implicitReleaseAfter                ENUMERATED {e2, e3, e4, e8},
        p0-Persistent                       SEQUENCE {
            p0-NominalPUSCH-Persistent          INTEGER (-126..24),
```

| SPS-Config information element |
|---|
| ```
        p0-UE-PUSCH-Persistent              INTEGER (-8..7)
    }       OPTIONAL,                                                -- Need OP
    twoIntervalsConfig                      ENUMERATED (true)    OPTIONAL,     -- Cond TDD
    ...,
    [[  p0-PersistentSubframeSet2-r12       CHOICE {
            release                             NULL,
            setup                               SEQUENCE {
                p0-NominalPUSCH-PersistentSubframeSet2-r12    INTEGER (-126..24),
                p0-UE-PUSCH-PersistentSubframeSet2-r12        INTEGER (-8..7)
            }
        }                                                        OPTIONAL      -- Need ON
    ]]
    }
}
N1PUCCH-AN-PersistentList ::=   SEQUENCE (SIZE (1..4)) OF INTEGER (0..2047)
-- ASN1STOP
``` |

| SPS-Config field descriptions |
|---|
| implicitReleaseAfter |
| Number of empty transmissions before implicit release, see TS 36.321 [6, 5.10.2]. Value e2 corresponds to 2 transmissions, e3 corresponds to 3 transmissions and so on. |
| n1PUCCH-AN-PersistentList, n1PUCCH-AN-PersistentListP1 |
| List of parameter: $n_{PUCCH}^{(1, p)}$ antenna port P0 and for antenna port P1 respectively, see TS 36.213 [23, 10.1]. Field n1-PUCCH-AN-PersistentListP1 is applicable only if the twoAntennaPortActivatedPUCCH-Format1a1b in PUCCH-ConfigDedicated-v1020 is set to true. Otherwise the field is not configured. |
| numberOfConfSPS-Processes |
| The number of configured HARQ processes for Semi-Persistent Scheduling, see TS 36.321 [6]. |
| p0-NominalPUSCH-Persistent |
| Parameter: $P_{O\_NOMINAL\_PUSCH}$ (0). See TS 36.213 [23, 5.1.1.1], unit dBm step 1. This field is applicable for persistent scheduling, only. If choice setup is used and p0-Persistent is absent, apply the value of p0-NominalPUSCH for p0-NominalPUSCH-Persistent, If uplink power control subframe sets are configured by tpc-SubframeSet, this field applies for uplink power control subframe set 1. |
| p0-NominalPUSCH-PersistentSubframeSet2 |
| Parameter: $P_{O\_NOMINAL\_PUSCH}$ (0). See TS 36.213 [23, 5.1.1.1], unit dBm step 1. This field is applicable for persistent scheduling, only. If p0-PersistentSubframeSet2-r12 is not configured, apply the value of p0-NominalPUSCH-SubframeSet2-r12 for p0-NominalPUSCH-PersistentSubframeSet2. E-UTRAN configures this field only if uplink power control subframe sets are configured by tpc-SubframeSet, in which case this field applies for uplink power control subframe set 2. |
| p0-UE-PUSCH-Persistent |
| Parameter: $P_{O\_UE\_PUSCH}$ (0). See TS 36.213 [23, 5.1.1.1], unit dB. This field is applicable for persistent scheduling, only. If choice setup is used and p0-Persistent is absent, apply the value of p0-UE-PUSCH for p0-UE-PUSCH-Persistent. If uplink power control subframe sets are configured by tpc-SubframeSet, this field applies for uplink power control subframe set 1. |
| p0-UE-PUSCH-PersistentSubframeSet2 |
| Parameter: $P_{O\_UE\_PUSCH}$ (0). See TS 36.213 [23, 5.1.1.1], unit dB. This field is applicable for persistent scheduling, only. If p0-PersistentSubframeSet2-r12 is not configured, apply the value of p0-UE-PUSCH-SubframeSet2 for p0-UE-PUSCH-PersistentSubframeSet2. E-UTRAN configures this field only if uplink power control subframe sets are configured by tpc-SubframeSet, in which case this field applies for uplink power control subframe set 2. |
| semiPersistSchedC-RNTI |
| Semi-persistent Scheduling C-RNTI, see TS 36.321 [6]. |
| semiPersistSchedIntervalDL |
| Semi-persistent scheduling interval in downlink, see TS 36.321 [6]. Value in number of sub-frames. Value sf10 corresponds to 10 sub-frames, sf20 corresponds to 20 sub-frames and so on. For TDD, the UE shall round this parameter down to the nearest integer (of 10 sub-frames), e.g. sf10 corresponds to 10 sub-frames, sf32 corresponds to 30 sub-frames, sf128 corresponds to 120 sub-frames. |
| semiPersistSchedIntervalUL |
| Semi-persistent scheduling interval in uplink, see TS 36.321 [6]. Value in number of sub-frames. Value sf10 corresponds to 10 sub-frames, sf20 corresponds to 20 sub-frames and so on. For TDD, the UE shall round this parameter down to the nearest integer (of 10 sub-frames), e.g. sf10 corresponds to 10 sub-frames, sf32 corresponds to 30 sub-frames, sf128 corresponds to 120 sub-frames. |
| twoIntervalsConfig |
| Trigger of two-intervals-Semi-Persistent Scheduling in uplink. See TS 36.321 [6, 5.10]. If this field is present, two-intervals-SPS is enabled for uplink. Otherwise, two-intervals-SPS is disabled. |

| Conditional presence | Explanation |
|---|---|
| TDD | This field is optional present for TDD, need OR; it is not present for FDD and the UE shall delete any existing value for this field. |

Figure 6:
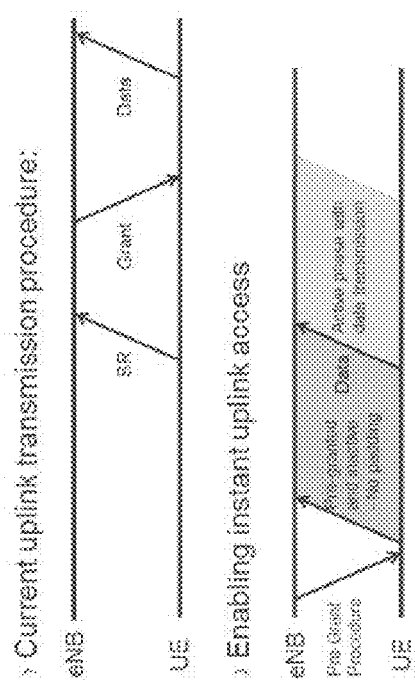
FIG. 6 is a reproduction of a figure from 3GPP RP-150310.

Semi-persistent scheduling enables a UE to consider a configured uplink grant occurs periodically after it is initiated. It may be initiated by receiving a network signaling to initiate semi-persistent scheduling (SPS). No network signaling is needed to allocate the following configured uplink grant after SPS is initiated. Based on 3GPP RP-150310, fast uplink access may be achieved by a specific type of SPS. The specific type of SPS is assumed to be with small size and short interval, for example, less than 10 ms. Further, the specific type of SPS is assumed to be pre-allocated. An eNB may allocate this kind of SPS resource to a UE without receiving any scheduling request or buffer status information. When the UE has data available for transmission as disclosed in 3GPP TS 36.321 v12.5.0, it can use resource configured by the SPS for uplink transmission. Compared with requesting uplink resource via scheduling request as disclosed in 3GPP TS 36.321 v12.5.0, the latency can then be reduced if the interval of the resource configured by the SPS is short enough. FIG. 6 which is reproduced from 3GPP RP-150310 shows how pre-allocated uplink grant (e.g. allocated by SPS) improves latency reduction compared with scheduling request procedure specified in 3GPP TS 36.321 v12.5.0. The resource configured by the specific type of SPS may be separated from resource configured by the legacy SPS (with longer interval) or jointly used.

In addition, it is also mentioned in 3GPP RP-150310 that the requirement of sending padding when there is an uplink (UL) resource but no data is in buffer can be removed. The intention of removing the requirement is to save battery power. However, it should be further evaluated whether the UE should completely not use any configured uplink grant when no data is available for transmission.

Traditionally, when a network would like to configure a SPS uplink grant to a UE, the network can understand whether the UE receives the SPS initiation successfully based on whether the UE performs a transmission using the configured grant because the UE should always use the configured grant once it is initiated. However, if the UE doesn't always use a configured grant, for example for the case of the configured grant intended for latency reduction when no data is available for transmission, the network may not be able to know whether or not the UE receives a signaling to configure the grant. If the UE really misses the signaling, for example for SPS resource allocation, the network may not be able to detect the situation until, for example, the UE triggers a scheduling request when there is data available for transmission.

On the other hand, traditionally, sound reference signal (SRS) transmission from a UE can be measured by the network to help the network to determine or adjust the following resource allocation. However, a UE only transmits SRS on active time as disclosed in 3GPP TS 36.321 v12.5.0. A configured uplink resource for the purpose of latency reduction is assumed to be with short interval and may occur in timing other than active time. It is possible that the UE has data available for transmission during non-active time, and performs a transmission using the configured uplink resource in non-active time. Then, the configured uplink resource may be sub-optimal due to no SRS transmission in non-active time.

To solve above issues, upon receiving physical downlink control channel (PDCCH) for SPS (re)initiation, a UE performs a new transmission using a configured uplink grant indicated by PDCCH if no data is available for transmission. The UE may transmit padding in the transmission. The UE does not perform a new transmission using a configured uplink grant in a TTI if no data is available for transmission and no PDCCH for SPS (re)initiation is received corresponding to the TTI. The UE performs a new transmission using a configured uplink grant if data is available for transmission. With respect to the problem of a network unable to know whether or not the UE receives a signaling to configure the uplink grant, the network can know whether a UE receives a SPS (re)initiation or not by whether the UE performs a transmission using the configured grant indicated by SPS (re)initiation. With respect to the problem of sub-optimal configured uplink resource mentioned above, if the network needs a UE to transmit something on physical uplink shared channel (PUSCH), the network can send a SPS (re)initiation to the UE.

Another alternative to solve above issues, a UE performs a transmission using a configured uplink grant periodically if no data is available for transmission. The UE may transmit padding in the transmission. For example, the UE maintains a timer, and trigger a transmission when the timer expires. The timer may be (re)started when the UE receives a SPS (re)initiation, or when the UE performs a transmission using a configured uplink grant.

In general, a configured uplink grant is available periodically after it is initiated. The configured uplink grant is initiated by a network signaling. No network signaling is needed to allocate the following configured uplink grant after it is initiated.

Unless specified otherwise, a UE may not use a configured uplink grant if no data is available for transmission. Unless specified otherwise, the UE may not transmit padding using the configured uplink grant. The period of the configured uplink grant may be less than a specified value. The specified value may be 10 ms or 10 transmission time intervals (TTIs). The period of the configured uplink grant may be 1 ms or 1 TTI. Alternatively, the period of the configured uplink grant may be 2 ms or 2 TTIs. Alternatively, the period of the configured uplink grant may be 5 ms or 5 TTIs.

The configured uplink grant may be pre-allocated. A UE may be allocated the configured uplink grant when no data is available for transmission. The UE may be allocated the configured uplink grant before the UE transmits a scheduling request or a buffer status report.

Figure 14:
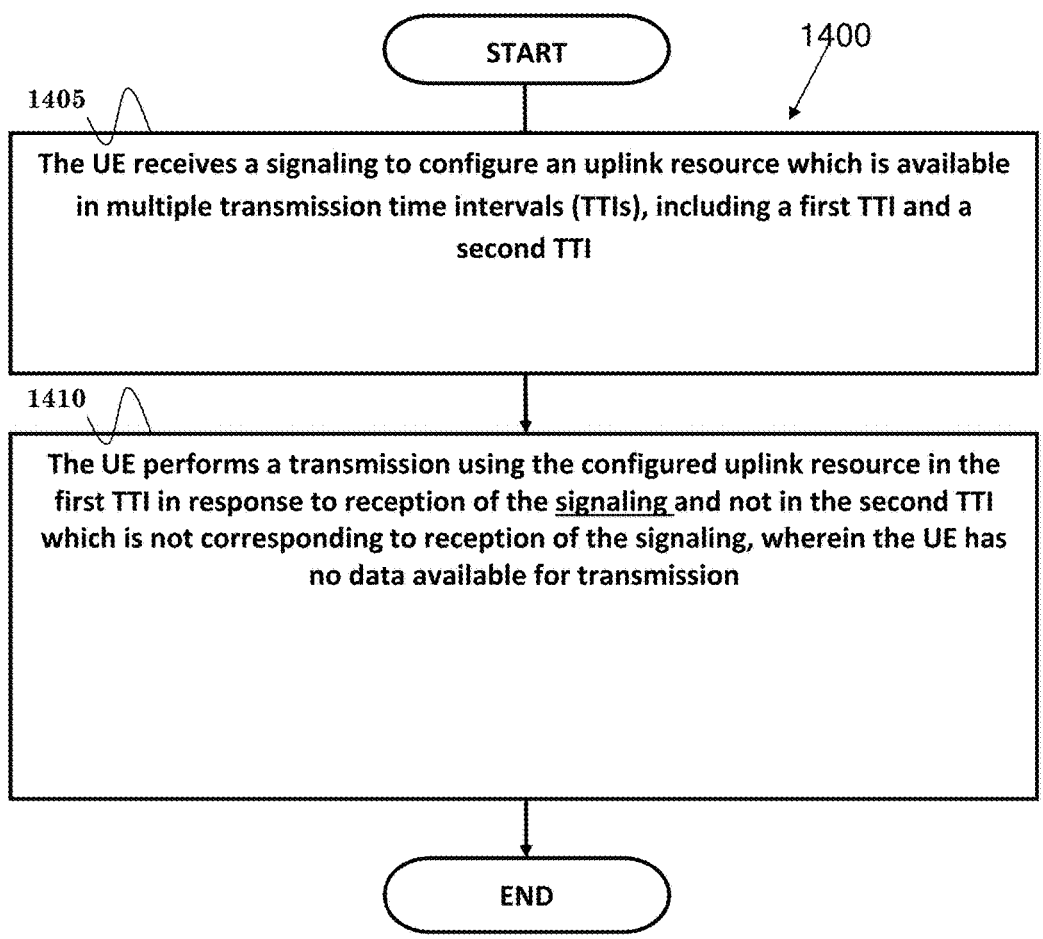
FIG. 14 is a flow chart according to one exemplary embodiment.

FIG. 14 is a flow chart 1400 in accordance with one exemplary embodiment from the perspective of a UE. In step 1405, the UE receives a signaling to configure an uplink resource which is available in multiple transmission time intervals (TTIs), including a first TTI and a second TTI. In step 1410, the UE performs a transmission using the configured uplink resource in the first TTI in response to reception of the signaling and not in the second TTI that is not corresponding to reception of the signaling, wherein the UE has no data available for transmission.

Referring back to FIGS. 3 and 4, in one embodiment from the perspective of a UE, the device 300 includes a program code 312 stored in memory 310. The CPU 308 could execute program code 312 to enable the UE (i) to receive a signaling to configure an uplink resource which is available in multiple transmission time intervals (TTIs), including a first TTI and a second TTI; (ii) perform a transmission using the configured uplink resource in the first TTI in response to reception of the signaling and not in the second TTI that is not corresponding to reception of the signaling, wherein the UE has no data available for transmission. Furthermore, the CPU 308 can execute the program code 312 to perform all of the above-described actions and steps or others described herein.

In the above embodiments, the UE could transmit padding using the configured uplink resource in the first TTI. The UE does not use the configured uplink resource for a new transmission in the second TTI. The UE could use the configured uplink resource for a new transmission if the UE has data available for transmission.

Figure 15:
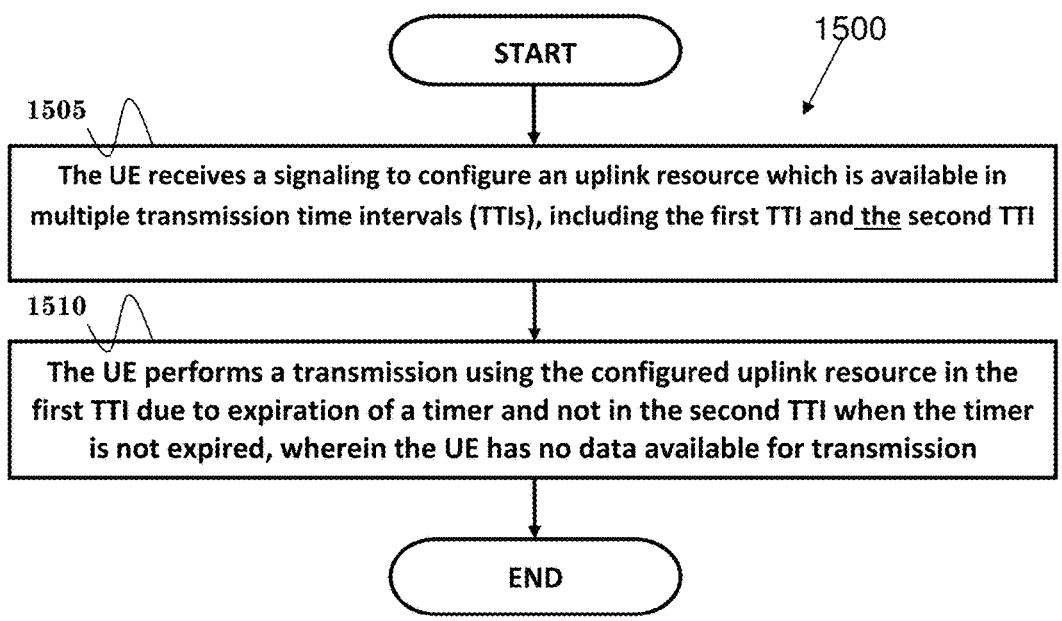
FIG. 15 is a flow chart according to one exemplary embodiment.

FIG. 15 is a flow chart 1500 in accordance with one exemplary embodiment from the perspective of a UE. In step 1505, the UE receives a signaling to configure an uplink resource which is available in multiple transmission time intervals (TTIs), including the first TTI and the second TTI. In step 1510, the UE performs a transmission using the configured uplink resource in the first TTI due to expiration of a timer and does not perform a transmission using the configured uplink resource in the second TTI when the timer is not expired, wherein the UE has no data available for transmission.

In another embodiment from the perspective of a UE, the device 300 includes a program code 312 stored in memory 310. The CPU 308 could execute program code 312 to enable the UE (i) to receive a signaling to configure an uplink resource which is available in multiple transmission time intervals (TTIs), including a first TTI and a second TTI; (ii) to perform a transmission using the configured uplink resource in the first TTI due to expiration of a timer; and not perform a transmission using the configured uplink resource in the second TTI when the timer is not expired, wherein the UE has no data available for transmission. Furthermore, the CPU 308 can execute the program code 312 to perform all of the above-described actions and steps or others described herein.

In the above embodiments, the UE could transmit padding in the transmission. The timer could be started or restarted when the UE receives the signaling to configure the uplink resource. Alternatively, the timer could be started or restarted when the UE performs a transmission using the configured uplink resource. The timer could be stopped when the configured uplink resource is de-configured. The length of the timer could be multiple times of periodicity of the configured uplink resource.

In the above embodiments, the configured uplink resource is periodically available once it is configured. Also, no network signaling is needed to allocate the configured uplink resource after it is initiated. The configured uplink resource is initiated by a signaling from a network or is pre-allocated. The signaling could be SPS initiation or SPS re-initiation as disclosed in 3GPP TS 36.321 v12.5.0.

In some embodiments, the UE receives the signaling before transmitting a scheduling request as disclosed in 3GPP TS 36.321 v12.5.0. In another embodiment, the UE receives the signaling before transmitting a BSR control element as disclosed in 3GPP TS 36.321 v12.5.0. In yet another embodiment, the UE receives the signaling when no data is available for transmission.

In any of the above embodiments, the UE does not transmit a Medium Access Control (MAC) protocol data unit (PDU) with padding only via the configured uplink resource. The padding includes (i) padding bit(s), (ii) at least one subheader associated with padding bit(s), (iii) a MAC control element corresponding to a Padding buffer status report (BSR) as disclosed in 3GPP TS 36.321 v12.5.0, (iv) a subheader associated with a MAC control element corresponding to a Padding BSR, (v) a MAC control element corresponding to a Padding Sidelink BSR as disclosed in 3GPP TS 36.321 v12.5.0, and/or (vi) a subheader associated with a MAC control element corresponding to a Padding Sidelink BSR.

In any of the above embodiments, periodicity, where the configured uplink resource is available, is shorter than a specified value. The specified value could be 10 ms. Periodicity, where the configured uplink resource is available, could be 1 ms, 2 ms or 5 ms.

In the above embodiments, the signaling could be transmitted on PDCCH. The signaling could be addressed to Semi-Persistent Scheduling Cell Radio Network Temporary Identifier (C-RNTI). Alternatively, the signaling could be a radio resource control (RRC) message.

In other embodiments, the configured uplink resource is on Physical Uplink Shared Channel (PUSCH) or Uplink Shared Channel (UL-SCH).

In the above embodiments, the data available for transmission could mean the data belonging to a logical channel that can utilize the configured uplink resource is available for transmission.

With the above embodiments, a UE missing a signaling to initiate a configured uplink resource can be detected by the network promptly. In addition, the network can utilize the configured uplink resource more efficiently.

Figure 7:
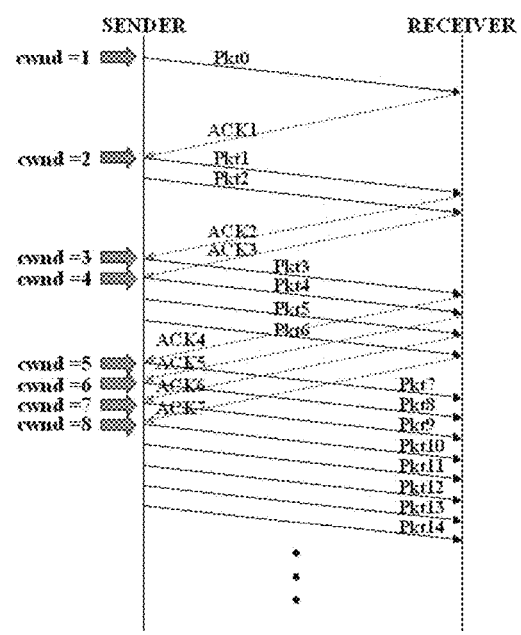
FIG. 7 is a reproduction of a figure from http://www.isi.edu/nsnam/DIRECTED_RESEARCH/DR_WANIDA/DR/JavisInActionSlowStartFrame.html.

Transmission Control Protocol (TCP) based traffic plays an important role in the world of internet. The operation of TCP is independent of lower layer protocols. And the independence may make performance of throughput or latency sub-optimal in cooperation with E-UTRAN MAC protocol. For example, for the case of TCP slow start, as shown in FIG. 7, a UE (as a receiver in FIG. 7) needs to UL TCP acknowledgement (ACK) as soon as possible upon reception of downlink (DL) TCP data to make the whole process complete faster so as to increase the data rate in a short time. It is also beneficial for the UE to send the next UL TCP data as soon as possible upon reception of DL TCP ACK associated with the previous UL TCP data.

To perform an uplink transmission, e.g. send UL TCP ACK, a UE needs to get an uplink grant. There are three options to get an uplink grant:

Option 1: Scheduling Request

Figure 8:
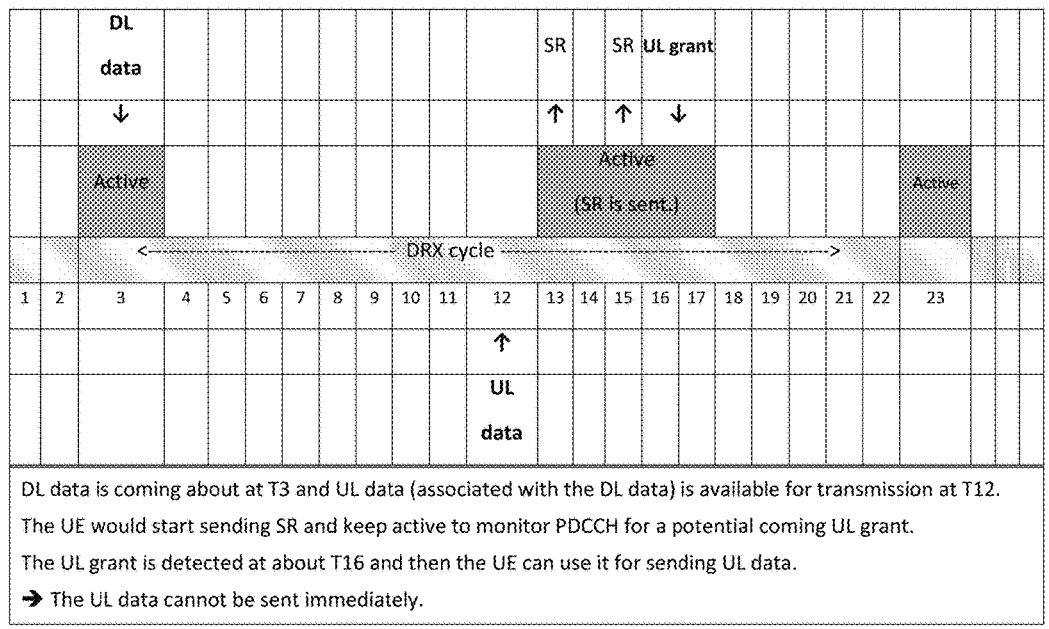
FIG. 8 is a timing diagram of requesting uplink grant via scheduling request.

Based on the current Evolved Universal Terrestrial Radio Access (E-UTRA) Medium Access Control (MAC) specification disclosed in 3GPP TS 36.321 v12.5.0, a UE should transmit a scheduling request to request an uplink grant when it has data available for transmission and no uplink resource is available. The procedure of scheduling request causes some delay between the data available for transmission and the data being transmitted. An example is illustrated in FIG. 8.

Option 2: Pre-Scheduled Dynamic Grant

Figure 9:
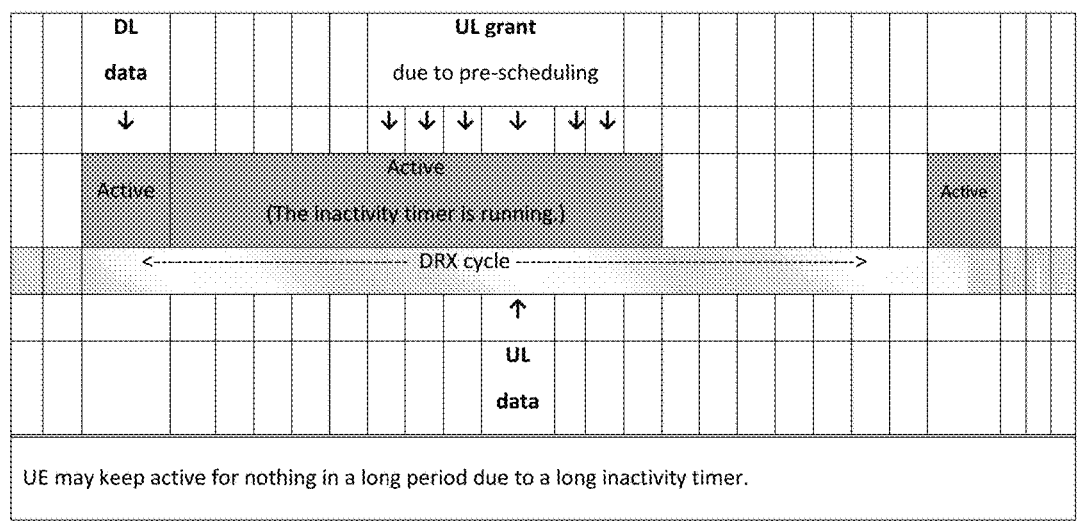
FIG. 9 is a timing diagram of a UE monitoring physical downlink control channel (PDCCH) for uplink grant.

A Network may schedule dynamic UL grant before receiving a scheduling request, e.g. if UL data is generated in response to some DL data so that the network can detect a need of UL grant for a UE in advance. The UE needs to monitor Physical Downlink Control Channel (PDCCH) for uplink grant when the network schedules an uplink grant. Based on the current E-UTRA MAC specification disclosed in 3GPP TS 36.321 v12.5.0, upon reception of a DL data, a UE would start an inactivity timer to keep active for the potential coming DL data while the timer is running. The inactivity timer could be set to a value between 0 to 2.5 seconds. If it is too short, the UL data (e.g. TCP ACK) associated with the DL data may not be available to be transmitted. If it is too long, the UE may waste UE power to monitor PDCCH for a potential UL grant allocation from the network. This is illustrated in FIG. 9.

Option 3: Pre-Scheduled Configured Grant

To reduce PDCCH overhead (and also UE power consumption due to monitoring PDCCH), a network may configure a UL grant before receiving a scheduling request, e.g. if UL data is generated in response to some DL data so that the network can detect a need of UL grant for a UE in advance. Semi-persistent scheduling enables a UE to consider a configured uplink grant occurs periodically after it is initiated. It may be initiated by receiving the network signaling to initiate SPS. No network signaling is needed to allocate the following configured uplink grant after SPS is initiated. Based on 3GPP RP-150310, fast uplink access may be achieved by a specific type of SPS. The specific type of SPS is assumed to be with small size and short interval, e.g. less than 10 ms. Further, the specific type of SPS is assumed to be pre-allocated. An eNB may allocate this kind of SPS resource to a UE without receiving any scheduling request or buffer status information. When the UE has data available for transmission as disclosed in 3GPP TS 36.321 v12.5.0, it can use resource configured by the SPS for uplink transmission. Compared with requesting uplink resource via scheduling request as disclosed in 3GPP TS 36.321 v12.5.0, the latency can then be reduced if the interval of the resource configured by the SPS is short enough. FIG. 6, which is reproduced from 3GPP RP-150310, shows how pre-allocated uplink grant (e.g. allocated by SPS) improves latency reduction compared with scheduling request procedure specified in 3GPP TS 36.321 v12.5.0. The resource configured by the specific type of SPS may be separated from resource configured by the legacy SPS (with longer interval) or jointly used. In addition, 3GPP RP-150310 provides that the requirement of sending padding when there is UL resource but no data is in buffer can be removed. The intention of removing the requirement is to save battery power.

Figure 10:
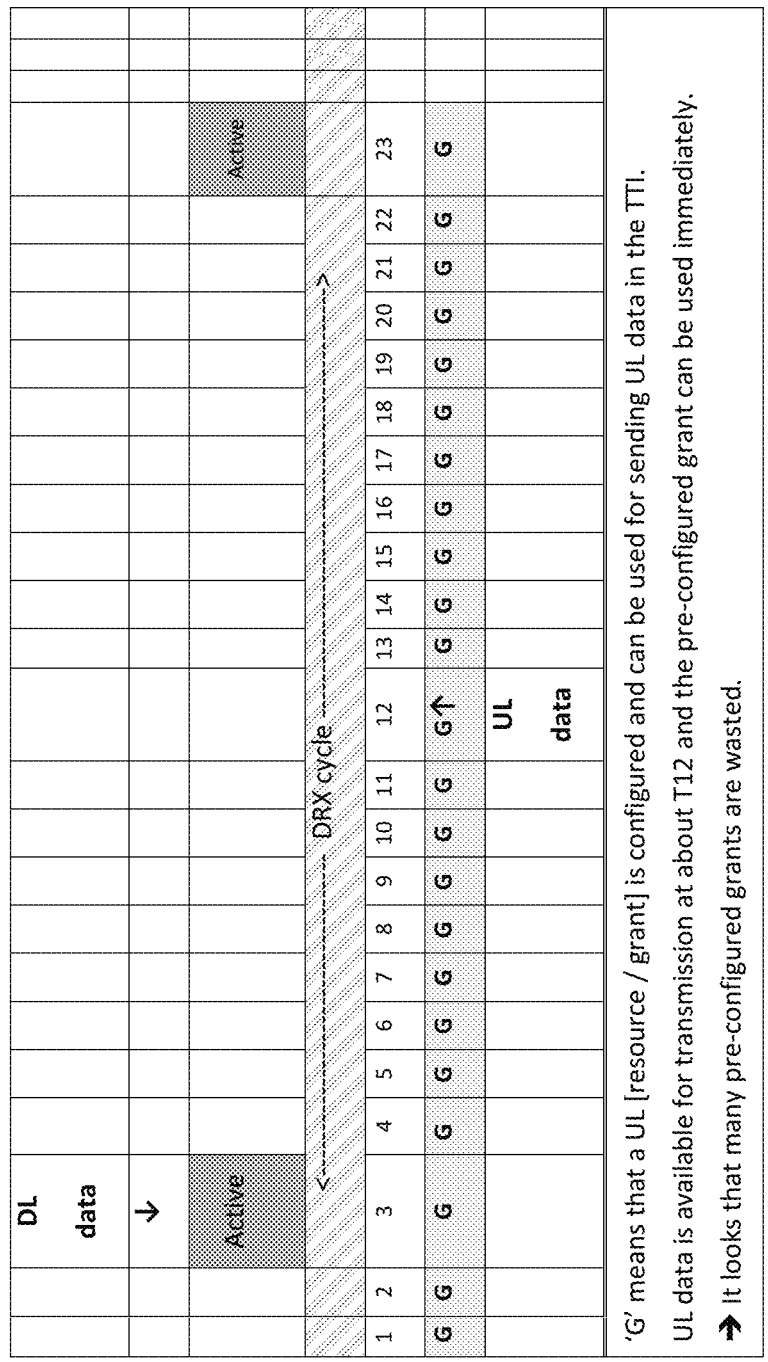
FIG. 10 is a timing diagram of pre-scheduled configured grant.

Using an UL resource (pre)-configured by the network occurring periodically (e.g. every 1 or 2 ms) is a feasible way to send the UL data (e.g. TCP ACK) as soon as possible since the UE does not need to perform a procedure of sending a scheduling request to the network for UL resource scheduling. However, it may result in resource waste if such UL resource is configured all the time. This is illustrated in FIG. 10.

In brief, the issue is how to send a UL data associated with a received DL data as soon as possible in a resource efficient way.

It is assumed that option 3 (pre-scheduled configured grant) mentioned above is used for resource allocation. In general, a configured uplink grant is available periodically after it is initiated. The configured uplink grant is initiated by a network signaling. No network signaling is needed to allocate the following configured uplink grant after it is initiated.

Unless specified otherwise, a UE may not use a configured uplink grant if no data is available for transmission. Unless specified otherwise, the UE may not transmit padding using the configured uplink grant. The period of the configured uplink grant may be less than a specified value. The specified value may be 10 ms or 10 TTIs. The period of the configured uplink grant may be 1 ms or 1 TTI. The period of the configured uplink grant may be 2 ms or 2 TTIs. The period of the configured uplink grant may be 5 ms or 5 TTIs.

The configured uplink grant may be pre-allocated. A UE may be allocated the configured uplink grant when no data is available for transmission. The UE may be allocated the configured uplink grant before the UE transmits a scheduling request or a buffer status report.

To solve the issue, in what timing a configured uplink resource is considered valid is defined and the understanding of the validity of the configured uplink resource should be aligned between a UE and a network node. In the following, two solutions are considered:
Solution 1
In one embodiment, validity of a (pre-)configured uplink resource (or grant) is controlled by a first timer. More specifically, the (pre-)configured uplink resource (or grant) is considered as valid when the first timer is running. The (pre-)configured uplink resource (or grant) may be considered as being suspended or released when the first timer is not running. Being suspended means that a UE keeps a configuration of the (pre-)configured uplink resource (or grant) but is not allowed to use it. The UE may resume using the (pre-)configured uplink resource (or grant) when the first timer is running. Being released means that a UE releases a configuration of the (pre-)configured uplink resource (or grant). The network should configure (or schedule) the (pre-)configured uplink resource (or grant) again through an explicit message, e.g. a PDCCH signaling, a MAC control element, or a radio resource control (RRC) message.

Alternatively, validity of a (pre-) configured uplink resource (or grant) is controlled by some event(s). More specifically, one or more specific event triggers a UE to consider the (pre-) configured uplink resource (or grant) as valid or not valid.

Figure 11:
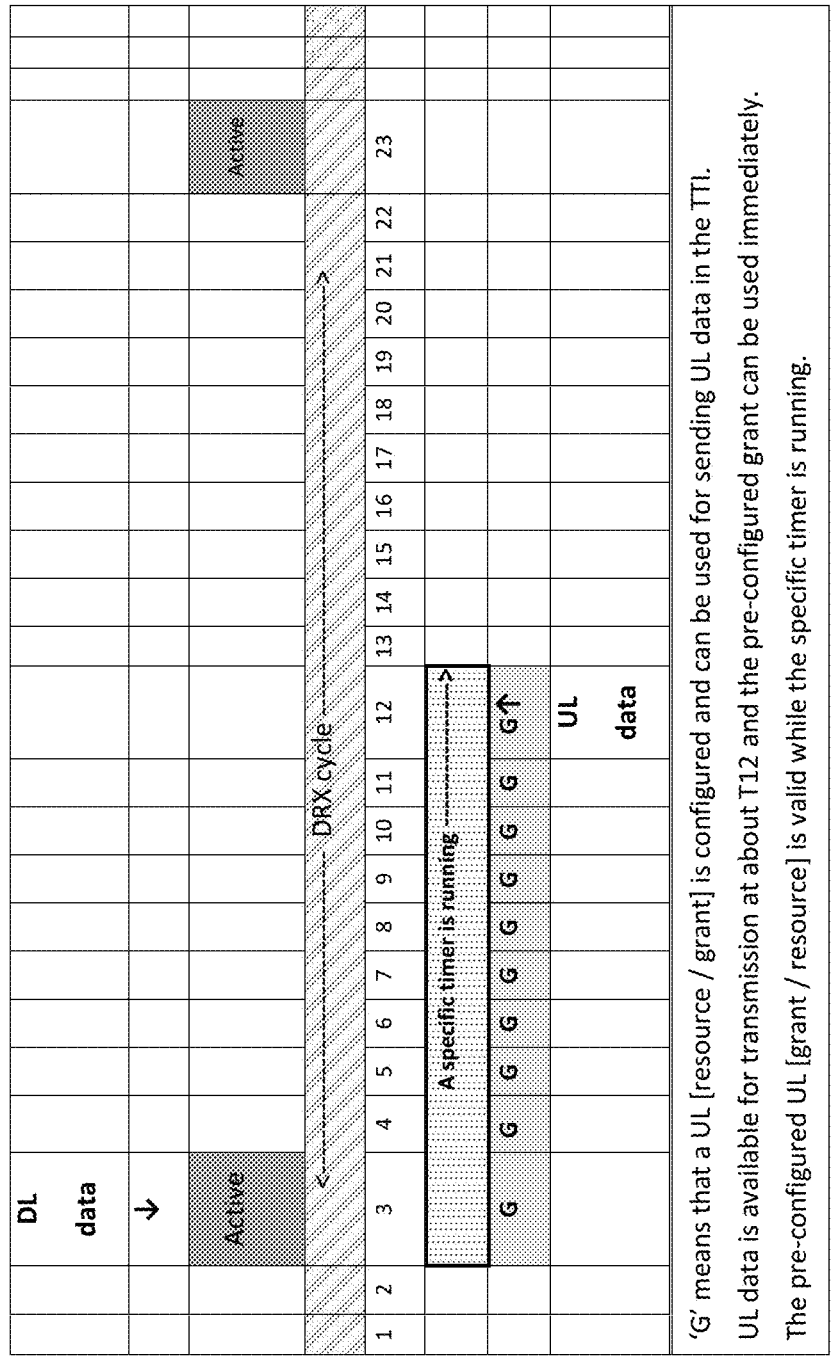
FIG. 11 is a timing diagram according to one exemplary embodiment.

The following handling of the first timer, e.g. conditions to start, re-start, or stop the first timer, can be combined arbitrarily (with a logical way). The following events to start timing and stop timing could be used to allow and not allow the UE to use the pre-configured UL grants. An example is illustrated in FIG. 11.
[Start or Re-Start the Timer]
    Upon reception of a specific DL data
        The specific DL data may be associated with a logical channel or service.
    Upon reception of PDCCH explicit indication
        The indication may be a DCI format to configure or schedule an UL resource. The UL resource may occur periodically.
[Stop the Timer]
    Upon sending UL data on a (pre-) configured UL resource (or grant)
    Upon using a (pre-) configured UL resource (or grant)
[Action Upon the Timer Expiry]
    A UE may suspend the (pre-) configured UL resource (or grant)
    A UE may release the (pre-) configured UL resource (or grant)

Figure 12:
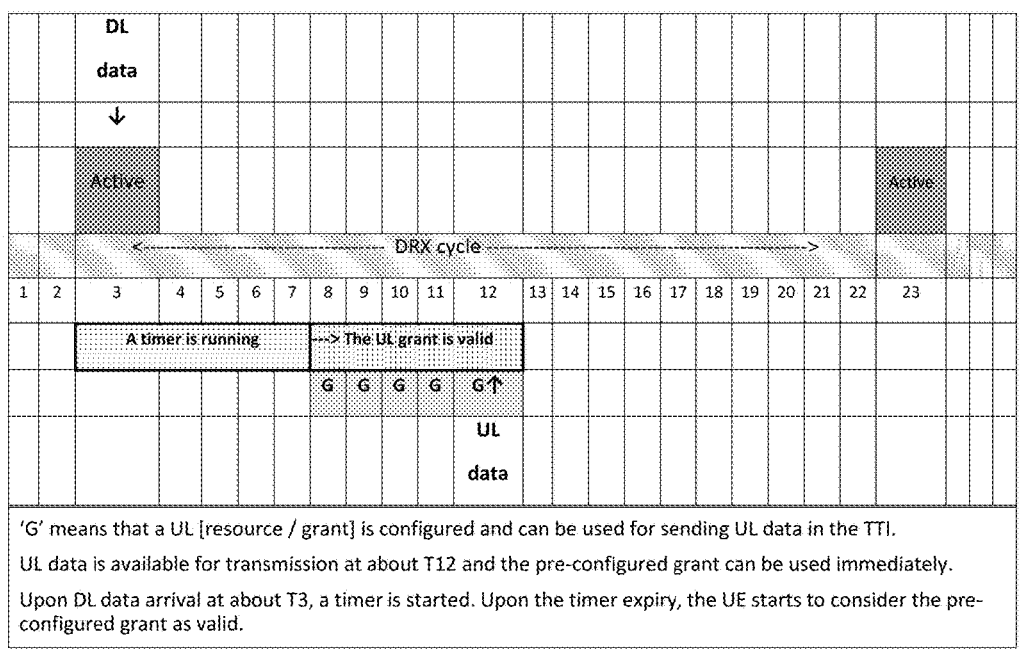
FIG. 12 is a timing diagram according to one exemplary embodiment.

Considering that the UL data may not be available for transmission immediately upon reception of the DL data, it may be beneficial for a UE not to consider the pre-configured UL resource as valid too early so as to save some resource waste. To do so, a second timer may be used. A UE starts to consider a (pre-) configured UL resource (or grant) as valid upon the second timer expiry. The UE may not consider the (pre-) configured UL resource (or grant) as valid when the second timer is running. The second timer may be started upon reception of DL data. The second timer may be started upon reception of PDCCH indicating the (pre-)configured UL resource (or grant). An example is illustrated in FIG. 12.
Solution 2

A UE considers a (pre-)configured uplink resource (or grant) as valid within Active Time as disclosed in 3GPP TS 36.321 v12.5.0 but may be restricted to some specific DRX timer, e.g. inactivity timer, or on-duration timer as defined in 3GPP TS 36.321 v12.5.0. 3GPP TS 36.321 v12.5.0 discloses that "Active Time: Time related to DRX operation, as defined in subclause 5.7, during which the MAC entity monitors the PDCCH." Subclause 5.7 is quoted below:
5.7 Discontinuous Reception (DRX)
[ . . . ]
When a DRX cycle is configured, the Active Time includes the time while:
    onDurationTimer or drx-InactivityTimer or drx-RetransmissionTimer or mac-ContentionResolutionTimer (as described in subclause 5.1.5) is running; or
    a Scheduling Request is sent on PUCCH and is pending (as described in subclause 5.4.4); or an uplink grant for a pending HARQ retransmission can occur and there is data in the corresponding HARQ buffer; or a PDCCH indicating a new transmission addressed to the C-RNTI of the MAC entity has not been received after successful reception of a Random Access Response for the preamble not selected by the MAC entity (as described in subclause 5.1.4).

Figure 13:
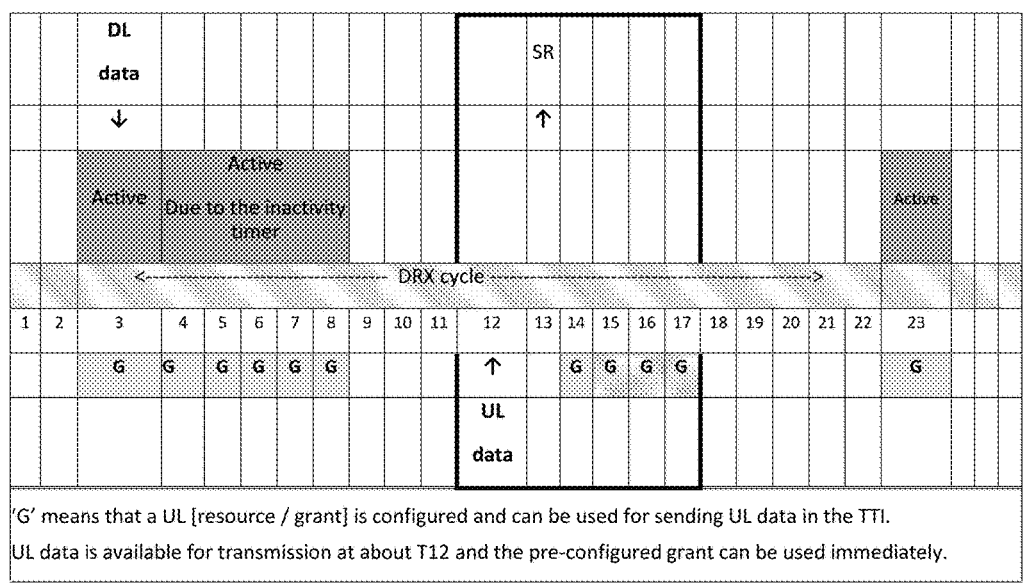
FIG. 13 is timing diagram according to one exemplary embodiment.

Upon UL data arrival, a UE would start to send a scheduling request (SR) and the UE could consider the (pre-)configured uplink resource (or grant) as valid to be used for sending the UL data. An example is illustrated in FIG. 13. In the example, upon sending SR at T13, UE may consider the pre-configured grant as valid in T14. Using this method, UE does not need to wait for the dynamic scheduling from the network and one round trip time can be saved. The concept is that the (1) network would pre-configure the UL resource, (2) the UE informs the network (like sending SR); and (3) the UE directly use the pre-configured UL resource.

In one exemplary method, a UE receives a first signaling to indicate a length for a first time period. The UE also receives a second signaling to configure a first uplink resource, in which the first configured uplink resource is available for UL transmission in multiple TTIs. The UE is allowed to use the first configured uplink resource in the multiple TTIs during the first time period. The UE is not allowed to use the first configured uplink resource outside the first time period.

Referring back to FIGS. 3 and 4, in one embodiment from the perspective of a UE, the device 300 includes a program code 312 stored in memory 310. The CPU 308 could execute program code 312 to enable the UE (i) to receive a first signaling to indicate a length for a first time period; (ii) to receive a second signaling to configure a first uplink resource, in which the first configured uplink resource is available for UL transmission in multiple TTIs; (iii) to be allowed to use the first configured uplink resource in the multiple TTIs during the first time period; and (iv) to be not allowed to use the first configured uplink resource outside the first time period. Furthermore, the CPU 308 can execute the program code 312 to perform all of the above-described actions and steps or others described herein.

In various embodiments, when the UE is allowed to use the first configured uplink resource, it means that the UE is allowed to use the first configured uplink resource for a new transmission. When the UE is not allowed to use the first configured uplink resource, it means that the UE is not allowed to use the first configured uplink resource for a new transmission.

In various embodiments, the UE may consider the first configured uplink resource as suspended outside the first time period. The term suspended means that the UE keeps a configuration of the first configured uplink resource but is not allowed to use it. The UE may resume using the first configured uplink resource at beginning of the first time period. Alternatively, the UE may consider the first configured uplink resource as released outside the first time period. The term released means that the UE releases a configuration of the first configured uplink resource.

One or more of the following conditions may be used to start the first time period. The first time period may be started (or restarted) when the UE receives a specific DL data. The specific DL data is associated with a logical channel or is associated with a service.

Alternatively, the first time period may be started (or restarted) when the UE receives a PDCCH explicit indication. The indication may be a downlink control information (DCI) format to configure (or schedule) an UL resource. The UL resource may occur periodically.

Alternatively, the first time period may be started (or restarted) due to receiving the second signaling. Alternatively, the first time period may be started (or restarted) when the UE uses the first configured UL resource.

One or more of the following conditions may be used to terminate the first time period. The first time period may be terminated when the UE sends UL data on the first configured UL resource. Alternatively, the first time period may be terminated when the UE receives a resource allocation for (only) one new UL transmission. Alternatively, the first time period may be terminated when the UE receives a resource allocation for adaptive retransmission of a transmission using the first configured uplink resource. Alternatively, the first time period may be terminated when the UE receives a signaling to configure a second uplink resource. The period of the second configured uplink resource may be larger than the first configured uplink resource.

In various embodiments, the UE may suspend the first configured UL resource at the end of the first time period. In other embodiments, the UE may release the first configured UL resource at the end of the first time period.

In various embodiments, the UE is allowed to use the first configured UL resource at the end of a second time period. Alternatively, the UE is not allowed to use the first configured UL resource during the second time period. The second time period may be started when the UE receives a specific DL data or when the UE receives PDCCH indicating the first configured UL resource.

In some embodiments, the first signaling and the second signaling are the same signaling.

In another exemplary embodiment, the UE receives a signaling to configure an uplink resource, wherein the configured uplink resource is available for UL transmission in multiple TTIs. The UE then considers whether the configured uplink resource as valid within an active time.

The active time may include one or more of the following time period. The active time may include the time while onDurationTimer or drx-InactivityTimer or drx-RetransmissionTimer or mac-ContentionResolutionTimer is running. The active time period may include the time while a Scheduling Request is sent on PUCCH and is pending. The active time period may include the time while an uplink grant for a pending HARQ retransmission can occur and there is data in the corresponding HARQ buffer. The active time may also include the time while a PDCCH indicating a new transmission addressed to the C-RNTI of the MAC entity has not been received after successful reception of a Random Access Response for the preamble not selected by the MAC entity.

In some embodiments, the first configured uplink resource is initiated by a network signaling. The network signaling may be SPS (re)initiation. The first configured uplink resource may be periodically available once it is configured. In some embodiments, no network signaling is needed to allocate the first configured uplink resource after it is initiated. In some embodiments, the first configured uplink resource is pre-allocated.

In the various embodiments, the UE receives the second signaling before transmitting a scheduling request, a BSR control element, or when no data is available for transmission. In another embodiment, the UE does not transmit a MAC PDU with padding only via the configured uplink resource.

In any of the above embodiments, the UE does not transmit a Medium Access Control (MAC) protocol data unit (PDU) with padding only via the configured uplink resource. In other embodiments, the padding includes padding bit(s). Alternatively, the padding includes at least one subheader associated with padding bit(s). The padding also may include a MAC control element corresponding to a Padding buffer status report (BSR). The padding may include a subheader associated with a MAC control element corresponding to a Padding BSR. In another embodiment, the padding includes a MAC control element corresponding to a Padding Sidelink BSR. Alternatively, the padding includes a subheader associated with a MAC control element corresponding to a Padding Sidelink BSR.

In any of the above embodiments, periodicity, where the configured uplink resource is available, may be shorter than a specified value. The specified value may be 10 ms. Periodicity, where the configured uplink resource is available, may be 1 ms, 2 ms or 5 ms.

In any of the above embodiments, the second signaling may be transmitted on PDCCH. In other embodiments, the second signaling may be addressed to Semi-Persistent Scheduling C-RNTI. In other embodiments, the second signaling may be a RRC message.

In any of the above embodiments, the first configured uplink resource is on PUSCH or is on UL-SCH.

Referring to FIG. 13, this figure illustrates that one node sends an indication to the other node (e.g. the network) to start using a resource configured previously for data transmission or reception between two nodes. Upon data arrival, UE may send an indication (like SR) to the eNB and then directly start using a pre-configured UL grant to send the arrival data. Therefore one round trip time between the UE and the eNB can be saved.

In another exemplary method, the UE receives a first signaling to configure a resource of a channel used for data transmission, wherein the resource may recur periodically. The UE sends an indication to the network. The UE sends data or a BSR of the data to the network by using the upcoming resource. Alternatively, the UE considers whether the resource to be valid upon transmission of the indication.

With the above methods, a configured uplink resource can be scheduled more efficiently.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/ processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for using a configured uplink resource by a user equipment (UE) in a wireless communication system, the method comprising:
receiving a signaling to configure an uplink resource which is available in multiple transmission time intervals (TTIs), including a first TTI and a second TTI; and
determining whether to perform a transmission using the configured uplink resource in a TTI based on whether the TTI is used to indicate that the UE has received the signaling, wherein the UE performs the transmission using the configured uplink resource in the first TTI which is used to indicate that the UE has received the signaling and not in the second TTI which is not used to indicate that the UE has received the signaling, and wherein the UE has no data available for transmission.

2. The method of claim 1, wherein the data available for transmission is the data belonging to a logical channel that can utilize the configured uplink resource.

3. The method of claim 1, wherein the signaling is semi-persistent scheduling (SPS) initiation or re-initiation.

4. The method of claim 1, wherein the UE transmits padding using the configured uplink resource in the first TTI.

5. The method of claim 4, wherein the padding includes padding bit(s), at least one subheader associated with padding bit(s), a Medium Access Control (MAC) control element corresponding to a Padding buffer status report (BSR), a subheader associated with a MAC control element corresponding to a Padding BSR, a MAC control element corresponding to a Padding Sidelink BSR, and/or a subheader associated with a MAC control element corresponding to a Padding Sidelink BSR.

6. The method of claim 1, wherein the UE does not transmit a MAC protocol data unit (PDU) via the configured uplink resource if the MAC PDU only contains padding.

7. The method of claim 1, further comprising:
using, by the UE, the configured uplink resource for a new transmission if the UE has data available for transmission.

8. The method of claim 1, wherein the configured uplink resource is periodically available once it is configured.

9. The method of claim 1, wherein the UE receives the signaling when no data is available for transmission.

10. The method of claim 1, wherein the transmission is a new transmission.

11. A user equipment (UE), comprising:
a control circuit;
a processor installed in the control circuit;
a memory installed in the control circuit and coupled to the processor,
wherein the processor is configured to execute a program code stored in the memory to:
receive a signaling to configure an uplink resource which is available in multiple transmission time intervals (TTIs), including a first TTI and a second TTI; and
determine whether to perform a transmission using the configured uplink resource in a TTI based on whether the TTI is used to indicate that the UE has received the signaling, wherein the UE performs the transmission using the configured uplink resource in the first TTI which is used to indicate that the UE has received the signaling and not in the second TTI which is not used to indicate that the UE has received the signaling, and wherein the UE has no data available for transmission.

12. The UE of claim 11, wherein the data available for transmission is the data belonging to a logical channel that can utilize the configured uplink resource.

13. The UE of claim 11, wherein the signaling is semi-persistent scheduling (SPS) initiation or re-initiation.

14. The UE of claim 11, wherein the UE transmits padding using the configured uplink resource in the first TTI.

15. The UE of claim 14, wherein the padding includes padding bit(s), at least one subheader associated with padding bit(s), a Medium Access Control (MAC) control element corresponding to a Padding buffer status report (BSR), a subheader associated with a MAC control element corresponding to a Padding BSR, a MAC control element corresponding to a Padding Sidelink BSR, and/or a subheader associated with a MAC control element corresponding to a Padding Sidelink BSR.

16. The UE of claim 11, wherein the UE does not transmit a MAC protocol data unit (PDU) via the configured uplink resource if the MAC PDU only contains padding.

17. The UE of claim 11, wherein the processor is further configured to execute a program code stored in the memory to use, by the UE, the configured uplink resource for a new transmission if the UE has data available for transmission.

18. The UE of claim 11, wherein the configured uplink resource is periodically available once it is configured.

19. The UE of claim 11, wherein the UE receives the signaling when no data is available for transmission.

20. The UE of claim 11, wherein the transmission is a new transmission.

* * * * *